(12) United States Patent
Goutte et al.

(10) Patent No.: US 7,672,830 B2
(45) Date of Patent: Mar. 2, 2010

(54) APPARATUS AND METHODS FOR ALIGNING WORDS IN BILINGUAL SENTENCES

(75) Inventors: Cyril Goutte, Le Versoud (FR); Michel Simard, Meylan (FR); Kenji Yamada, Redondo Beach, CA (US); Eric Gaussier, Eybens (FR); Arne Mauser, Aachen (DE)

(73) Assignee: Xerox Corporation, Norwalk, CT (US)

( * ) Notice: Subject to any disclaimer, the term of this patent is extended or adjusted under 35 U.S.C. 154(b) by 820 days.

(21) Appl. No.: 11/137,590

(22) Filed: May 26, 2005

(65) Prior Publication Data

US 2006/0190241 A1      Aug. 24, 2006

Related U.S. Application Data

(60) Provisional application No. 60/654,498, filed on Feb. 22, 2005.

(51) Int. Cl.
*G06F 17/28* (2006.01)
*G06F 17/27* (2006.01)

(52) U.S. Cl. .................................. 704/2; 704/4; 704/9
(58) Field of Classification Search ....................... 704/2
See application file for complete search history.

(56) References Cited

U.S. PATENT DOCUMENTS

| | | | | |
|---|---|---|---|---|
| 5,477,451 | A | * | 12/1995 | Brown et al. ..................... 704/9 |
| 5,510,981 | A | * | 4/1996 | Berger et al. ..................... 704/2 |
| 5,805,832 | A | * | 9/1998 | Brown et al. ..................... 711/1 |
| 5,907,821 | A | * | 5/1999 | Kaji et al. ....................... 704/4 |
| 6,236,958 | B1 | | 5/2001 | Lange et al. |
| 7,269,598 | B2 | * | 9/2007 | Marchisio .................... 707/102 |
| 7,587,307 | B2 | * | 9/2009 | Cancedda et al. .............. 704/2 |
| 2003/0101187 | A1 | | 5/2003 | Gaussier et al. |
| 2003/0204400 | A1 | * | 10/2003 | Marcu et al. ................. 704/251 |

OTHER PUBLICATIONS

Renders, KerMIT, 2002, <<http://www.euro-Kermit.org/Documents/D3.ps>> p. 1-66.*
Och et al, "A Systematic Comparison of Various Statistical Alignment Models", 2003, ACL, p. 19-51.*
Zens et al "Phrase-Based Statistical Machine Translation" Sep. 25, 2002, German Conf. on Artificial intelligence, vol. 2479, pp. 18-32.*

(Continued)

*Primary Examiner*—Richemond Dorvil
*Assistant Examiner*—Olujimi A Adesanya
(74) *Attorney, Agent, or Firm*—Fay Sharpe LLP (57) ABSTRACT

Methods are disclosed for performing proper word alignment that satisfy constraints of coverage and transitive closure. Initially, a translation matrix which defines word association measures between source and target words of a corpus of bilingual translations of source and target sentences is computed. Subsequently, in a first method, the association measures in the translation matrix are factorized and orthogonalized to produce cepts for the source and target words, which resulting matrix factors may then be, optionally, multiplied to produce an alignment matrix. In a second method, the association measures in the translation matrix are thresholded, and then closed by transitivity, to produce an alignment matrix, which may then be, optionally, factorized to produce cepts. The resulting cepts or alignment matrices may then be used by any number of natural language applications for identifying words that are properly aligned.

24 Claims, 6 Drawing Sheets

OTHER PUBLICATIONS

Simard, "Text-Translation Alignment: Three Languages Are Better Than Two", 1999, Proc. of the 1999 Joint SIGDAT Conf. on Emperical Methods in Natural Language Processing, pp. 2-11.*

H. Akaike, "A new look at the statistical model identification", IEEE Tr. Automatic Control, 19(6):716-723, 1974.

A.-M. Barbu, "Simple linguistic methods for improving a word alignment algorithm", Le poids des mots—Proc. JADT04, pp. 88-98, 2004.

P. F. Brown, S. A. Della Pietra, V. J. Della Pietra, and R. L. Mercer, "The mathematics of statistical machine translation: Parameter estimation", Computational linguistics, 19:263-312, 1993.

H. Dejean, E. Gaussier, C. Goutte, and K. Yamada, "Reducing parameter space for word alignment", HLT-NAACL 2003 Workshop: Building and Using Parallel Texts, pp. 23-26, 2003.

A. P. Dempster, N. M. Laird, and D. B. Rubin, "Maximum likelihood from incomplete data via the EM algorithm", J. Royal Statistical Society, Series B. 39(1):1-38, 1977.

C. Goutte, K. Yamada, and E. Gaussier, "Aligning Words Using Matrix Factorisation", 42nd Annual Meeting of the Association for Computational Linguistics, Barcelona, Spain, Jul. 25-26, 2004.

T. Hofmann, "Probabilistic latent semantic analysis", Uncertainty in Artificial Intelligence, pp. 289-296, 1999.

P. Koehn, F. Och, and D. Marcu, "Statistical phrase-based translation", Proc. HLT-NAACL, 2003.

D. D. Lee and H. S. Seung, "Learning the parts of objects by non-negative matrix factorization", Nature, 401:788-791, 1999.

D. D. Lee and H. S. Seung, "Algorithms for non-negative matrix factorization", NIPS*13, pp. 556-562, 2001.

R. Mihalcea and T. Pedersen, "An evaluation exercise for word alignment", HLT-NAACL 2003 Workshop: Building and Using Parallel Texts, pp. 1-10, 2003.

F. Och and H. Ney, "A comparison of alignment models for statistical machine translation", Proc. COLING'00, pp. 1086-1090, 2000.

F. Och, C. Tillmann, and H. Ney, "Improved alignment models for statistical machine translation", Proc. EMNLP, pp. 20-28, 1999.

K. Rose, E. Gurewitz, and G. Fox, "Vector quantization by deterministic annealing", IEEE Transactions on information theory, 38(4):1249-1257, 1992.

G. Schwartz, "Estimating the dimension of a model", the Annals of Statistics, 6(2):461-464, 1978.

M. Simard and P. Langlais, "Statistical translation alignment with compositionality constraints", HLT-NAACL 2003 Workshop: Building and Using Parallel Texts, pp. 19-22, 2003.

C. Tillmann and F. Xia, "A phrase-based unigram model for statistical machine translation", Proc. HLT-NAACL, 2003.

D. Yarowsky, G. Ngai, and R. Wicentowski, "Inducing multilingual text analysis tools via robust projection across aligned corpora", Proc. HLT, 2001.

* cited by examiner

APPARATUS AND METHODS FOR ALIGNING WORDS IN BILINGUAL SENTENCES

CROSS REFERENCE TO RELATED APPLICATION

Priority is claimed from U.S. Provisional Application No. 60/654498, filed Feb. 22, 2005, entitled "Apparatus And Methods For Aligning Words In Bilingual Sentences", by the same inventors and assignee, which is incorporated herein by reference.

BACKGROUND AND SUMMARY

The following relates generally to methods, and apparatus therefor, for performing bilingual word alignment.

Aligning words from sentences, which are mutual (i.e., bilingual) translations, is an important problem to resolve as the aligned words are used for carrying out various linguistic or natural language applications. Examples of linguistic applications that make use of mutual translations include: the identification of phrases or templates in phrase-based machine translation; machine translation; and the projection of linguistic annotation across languages. Generally, known methods for performing word alignment are limited in performance (e.g., too computationally complex) or precision (e.g., no guarantee an alignment is "proper", as defined herein). Accordingly, there continues to exist a need for improved methods for carrying out word alignment from sentences.

Methods, and systems and articles of manufacture therefor, are described herein for producing "proper" alignments of words at the sentence level. In accordance with various embodiments described herein of such methods, given a source sentence $f = f_1 \ldots f_i \ldots f_I$ composed of source words $f_1, \ldots f_I$, and a target sentence $e = e_1 \ldots e_j \ldots e_J$ composed of target words $e_1, \ldots e_J$, the various embodiments identify source words $f_i$ and target words $e_j$ in the source and target sentences such that the words are "properly" aligned (i.e., are in mutual correspondence). As defined herein, words from a source sentence and target sentence are "properly" aligned when they satisfy the constraints of "coverage" and "transitive closure".

For the purpose of describing a proper alignment between words at the sentence level, a cept is characterized herein as a semantic invariant that links both sides of an alignment. An N-to-M alignment is therefore represented using cepts as an N-to-1-to-M alignment (i.e., N source words to one cept to M target words). As embodied in this notion of a cept, word alignment is proper if the alignment covers both sides (i.e., each word is aligned to at least one other word) and is closed by transitivity (i.e., all N source words in an N-to-M alignment are aligned to all M target words).

In accordance with the methods, apparatus and articles of manufacture described herein, words of natural language sentences are properly aligned. In performing the method, a corpus of aligned source sentences $f = f_1 \ldots f_i \ldots f_I$ and target sentences $e = e_1 \ldots e_j \ldots e_J$ is received, where the source sentences are in a first natural language and the target sentences are in a second natural language. A translation matrix M is produced with association measures $m_{ij}$. Each association measure $m_{ij}$ in the translation matrix provides a valuation of association strength between each source word $f_i$ and each target word $e_j$. One or more of an alignment matrix A and cepts are produced that link aligned source and target words, where the alignment matrix and cepts define a proper N:M alignment between source and target words by satisfying coverage and transitive closure. Coverage is satisfied when each source word is aligned with at least one target word and each target word is aligned to at least one source word, and transitive closure is satisfied if when source word $f_i$ is aligned to target words $e_j$ and $e_l$, and source word $f_k$ is aligned to target word $e_l$, then source word $f_k$ is also aligned to target word $e_j$.

Advantageously, these embodiments are computationally efficient methods for determining proper word alignment in sentences. In addition, further advantages may be realized as proper word alignment enables the production of improved translation models. For example, better chunks for phrase-based translation models may be extracted with properly aligned sentence translations. Further, proper word alignments advantageously insure that cept-based phrases cover entire source and target sentences.

BRIEF DESCRIPTION OF THE DRAWINGS

These and other aspects of the disclosure will become apparent from the following description read in conjunction with the accompanying drawings wherein the same reference numerals have been applied to like parts and in which.

DETAILED DESCRIPTION

The table that follows sets forth definitions of terminology used throughout the specification, including the claims and the figures.

| Term | Definition |
| --- | --- |
| Sentence | A clause, a phrase or a group of clauses or phrases forming a unit of more than one word. |
| Source and Target Sentence | A sentence in a first natural language and a sentence in a second natural language. |
| Proper N:M Alignment (or Proper Alignment) | Words from a source sentence and a target sentence are properly N:M aligned when they satisfy the constraints of coverage and transitive closure, where the value of N and M range between one and the length of the source and target sentences, respectively. |
| Coverage | Coverage is satisfied when every word in the source sentence is aligned to at least one word in the target sentence, and every word in the target sentence is aligned to at least one word in the source sentence. |

-continued

| Term | Definition |
| --- | --- |
| Transitive Closure | Transitive closure is satisfied if when source word $f_i$ is aligned to target words $e_j$ and $e_l$, and source word $f_k$ is aligned to target word $e_L$, then source word $f_k$ is also aligned to target word $e_j$. |
| Cept | A central pivot through which a subset of source words from the source sentence is aligned with a subset of target words from the target sentence, where each word satisfies the constraint of propriety. Generally, M-to-1-to-N alignments are from a subset of source words to a cept to a subset of target words. A cept guarantees transitive closure as long as each source or target word is connected to a single cept. |
| Propriety (or proper) | Each target and source word is associated with exactly one cept, and each cept is associated with at least one source word and at least one target word. |

A. Overview of Methods for Word Alignment

Figure 1:
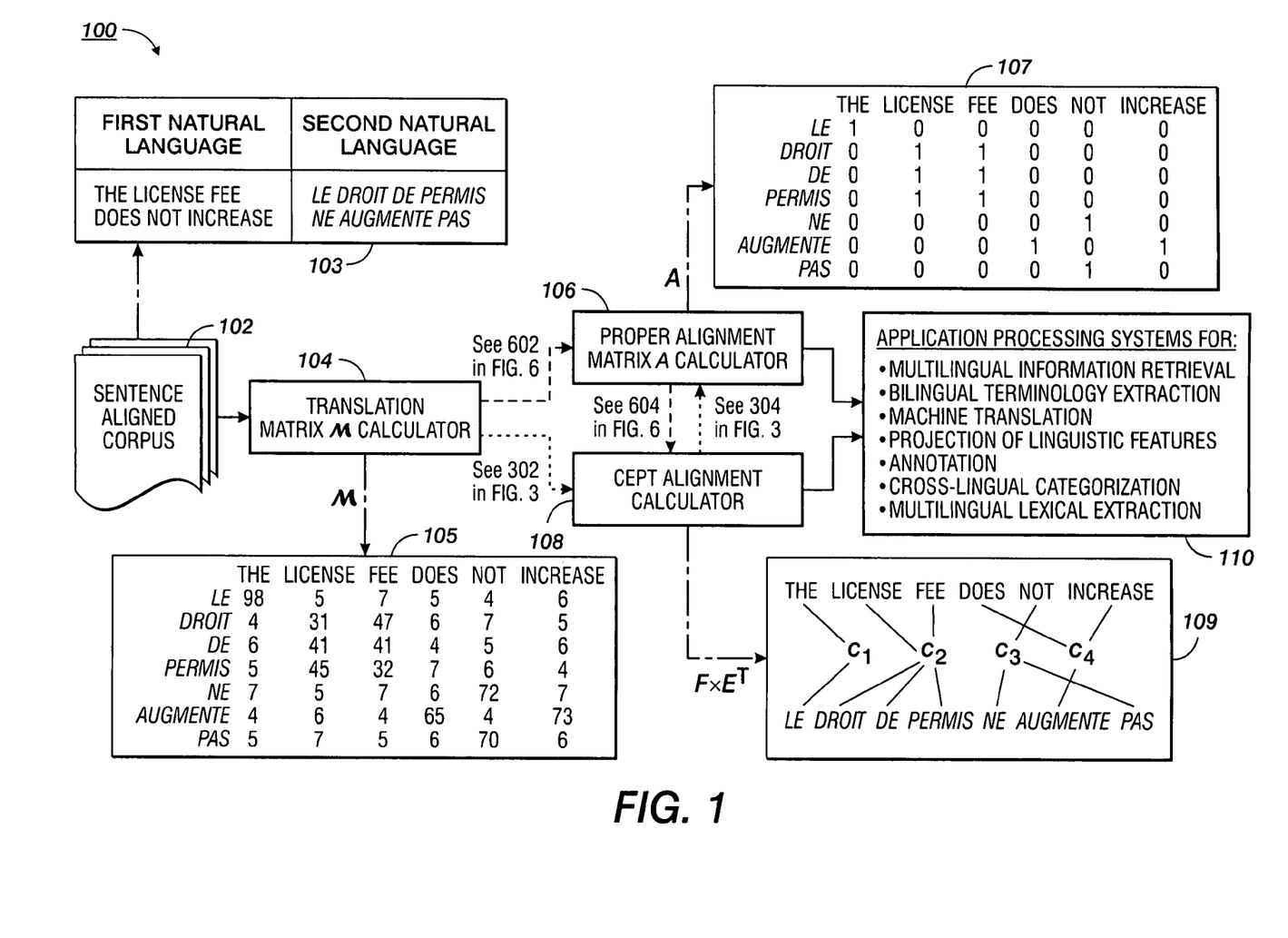
FIG. 1 illustrates a system for performing proper word alignment of sentences in a first natural language (e.g., English) with sentences in a second natural language (e.g., French)

FIG. 1 illustrates a system 100 for performing proper word alignment of sentences in a first natural language (e.g., English) with bilingual translations of sentences in a second natural language (e.g., French). The system 100 includes translation matrix calculator 104, proper alignment matrix calculator 106, and cept alignment calculator 108. The output produced by the calculators 106 and/or 108 may then be used by any of the one or more linguistic or natural language applications forming part of application processing systems 110.

B. Translation Matrix Calculation

The translation matrix calculator 104 takes as input a sentence aligned corpus 102 and produces a translation matrix M with word association measures $m_{ij}$. Corpus 103 is an example of a sentence aligned corpus, with a single sentence illustrated in a first and second natural language. Matrix 105 is an example of a translation matrix M produced by the calculator 104 using the sentence aligned corpus 103.

In one embodiment, the translation matrix M may be defined as an I×J translation matrix $M=[m_{ij}]$, such that $m_{ij} \geq 0$ measures the strength of the association between source word $f_i$ and target word $e_j$, where large values of $m_{ij}$ indicate a close association between pairs of source and target words. Various methods may be used for estimating the association measures in the translation matrix M, including using a translation table (e.g., using a bilingual dictionary) or a count from an N-best list.

Figure 2:
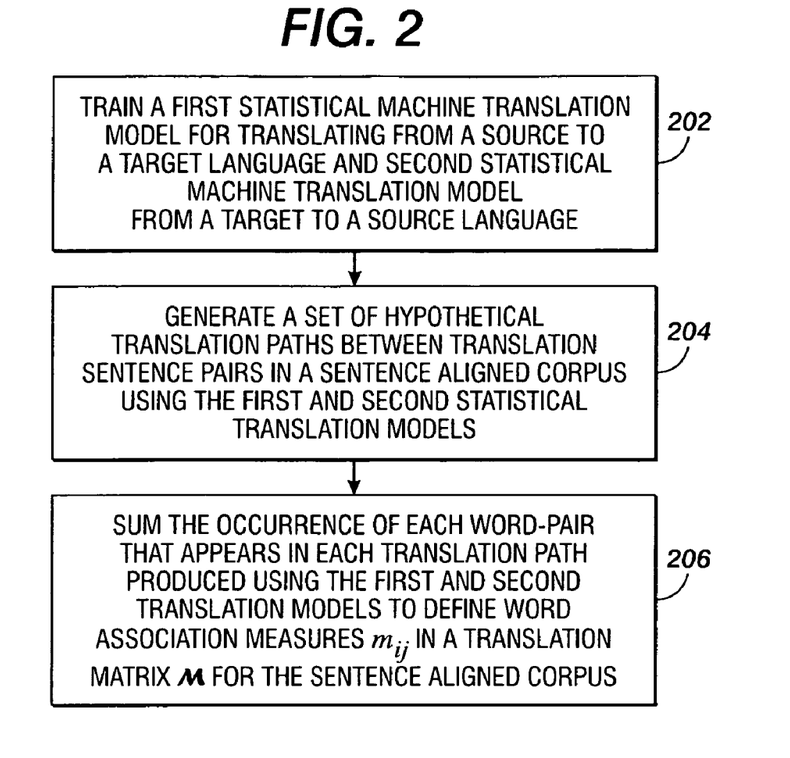
FIG. 2 sets forth a method for estimating association measures in a translation matrix M.

FIG. 2 sets forth a method that may be performed by the translation matrix calculator 104 shown in FIG. 1 for estimating association measures in a translation matrix using a count from an N-best list. At 202, a first statistical machine translation model is trained for translating from a source language to a target language and a second statistical machine translation model is trained for translating from a target language to a source language using training data. An example of a translation model is the word-based translation model disclosed by P. F. Brown, S. A. Della Pietra, V. J. Della Pietra, and R. L. Mercer, entitled "The Mathematics Of Statistical Machine Translation: Parameter Estimation", in Computational Linguistics, 19:263-312, 1993, which is incorporated in its entirely herein by reference and referred to herein as the IBM models. It will be appreciated by those skilled in the art that such word-based translation models propose hypothetical translation paths between pairs of sentences (i.e., hypothetical explanations of how the target sentence was produced from the source sentence) in terms of which source word is at the origin of which target word, and vice versa. While these translation paths can be seen as alignments between words, they do not account for general M:N relationships between words, which is a property of alignment matrix A produced by the calculator 106.

At 204, a set of hypothetical translation paths is generated between translation sentence pairs in the sentence aligned corpus 102 using the first and second statistical translation models trained at 202. At 206, the occurrence of each word-pair that appears in each translation path produced using the first and second translation models is summed to define word association measures $m_{ij}$ in a translation matrix M for the sentence aligned corpus 102.

For example, the translation matrix 105 in FIG. 1 sets forth the sum of source and target word-pairs that appear in translation paths produced using the first and second statistical translation models (trained at 202). For instance, assuming the first and second statistical translation models are each used to produce a set of fifty translations of sentence pairs in the aligned corpus (generated at 204), the resulting translation matrix 105 indicates, for example, that for the source word "le" and the target word "the", the source word "le" is translated to the target word "the" and the target word "the" is translated to the source word "le" a total of ninety-eight times (summed at 206) in the set of one hundred translations (generated at 204). Alternatively stated, the resulting translation matrix 105 indicates that ninety-eight hypothetical translation paths for the word-pair "le" and "the" appear in the two sets of fifty translations of sentence pairs in the aligned corpus.

C. Details of First Method for Proper Word Alignment

The first method for aligning words employs matrix factorization to produce proper alignments of words in a translation matrix. In this first method, proper alignments between source and target words are represented by an I×J proper alignment matrix $A=[a_{ij}]$, such that $a_{ij}>0$ if $f_i$ is aligned with $e_j$ and $a_{ij}=0$ otherwise. Similarly, given K cepts, source/target words to cepts alignments may be represented by an I×K matrix F and a J×K matrix E, with positive elements indicating alignments.

Finding a proper alignment matrix A using this first method, corresponds to finding matrix F and matrix E such that:

$$M \approx F \times S \times E^T, \qquad [1]$$

where S is a diagonal K×K scaling matrix which may assign different weights to different cepts and M is a translation matrix as defined above. As matrix F and matrix E contain only positive elements, this is an instance of non-negative matrix factorization (NMF). NMF is described in the following publication which is incorporated in its entirely herein by reference: Lee and Seung, "Learning The Parts Of Objects By Non-Negative Matrix Factorization", Nature, 401:788-791, 1999.

Because NMF decomposes a matrix into additive, positive components, it naturally yields a sparse representation. In addition, the propriety constraint imposes that words are aligned to exactly one cept (i.e., that each row of the matrices E and F has exactly one non-zero component, a property defined herein as "extreme sparsity"). Using the notation, $F=[F_{ij}]$, this provides that:

$$\forall i, \forall k \neq l, F_{ik} \cdot F_{il} = 0,$$

as row i in the matrix F contains a single non-zero element, either element $F_{ik}$ or element $F_{il}$ must be equal to zero, an immediate consequence of which is that F is an orthogonal matrix (and similarly, matrix E is an orthogonal matrix). Aligning the source and target words in the translation matrix M therefore reduces to performing a decomposition into orthogonal non-negative factors.

Figure 3:
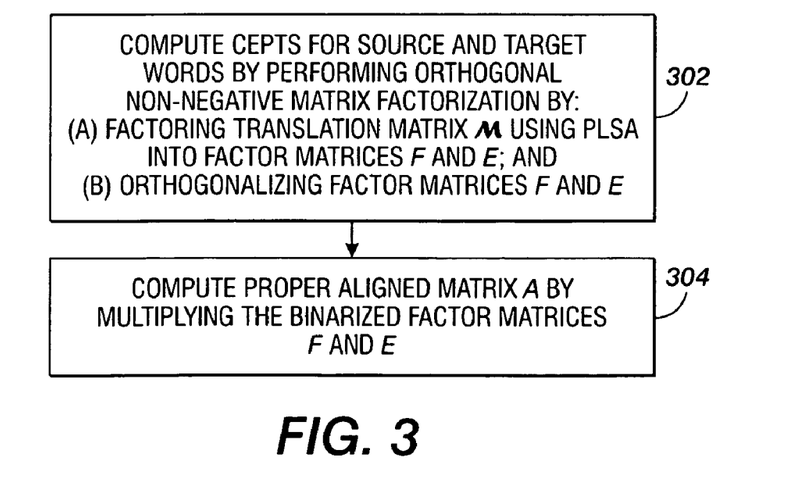
FIG. 3 is a flow diagram of a first method for aligning words in bilingual sentences.

FIG. 3 is a flow diagram setting forth the details of performing the first method. With reference again to FIG. 1, the cept alignment calculator 108 performs operations as set forth at 302 in FIG. 3, and the proper alignment matrix calculator 106 performs operations as set forth at 304 in FIG. 3, the details of which are discussed below.

At 302, cepts are computed for source and target words in two stages, which amount to performing orthogonal non-negative matrix factorization (ONMF). In a first stage at 302 (A), the translation matrix M is factorized into factor matrices F and E using probabilistic latent semantic analysis (PLSA), which is described in the following publication which is incorporated in its entirely herein by reference: T. Hofmann, "Probabilistic Latent Semantic Analysis", in Uncertainty in Artificial Intelligence, pages 289-296, 1999. In a second stage at 302(B), the factor matrices F and E are orthogonalized using a maximum a posteriori (MAP) assignment of words to cepts.

Figure 4:
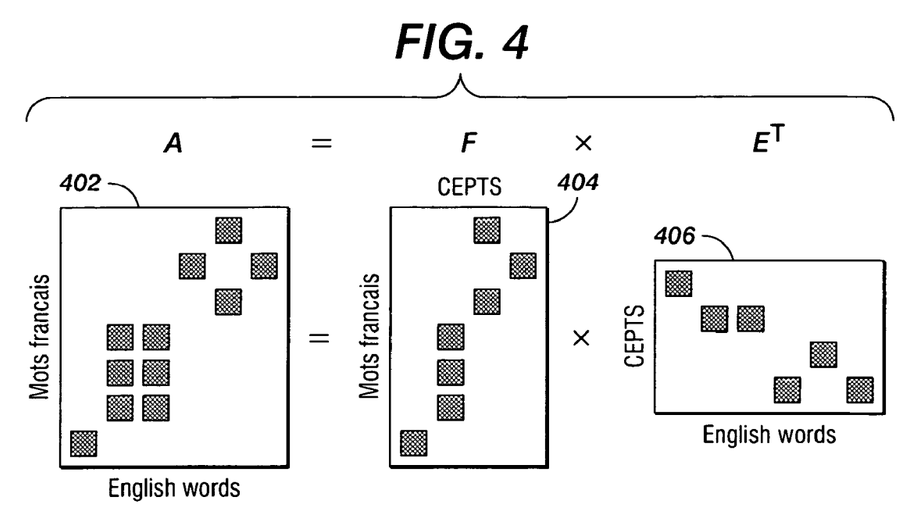
FIG. 4 illustrates an example proper alignment matrix A produced from a binarized factor matrix F and the transpose of a binarized factor matrix E.

At 304, the proper alignment matrix A is produced by computing the product of the binarized factor matrix F and the transpose of the binarized factor matrix E. The alignment matrix A is an I×J alignment matrix, such that $a_{ij}=1$ if $f_i$ is aligned with $e_j$ and $a_{ij}=0$ otherwise. FIG. 4 illustrates an example proper alignment matrix A at 402 produced (at 304 in FIG. 3) from binarized factor matrix F at 404 and the transpose of binarized factor matrix E at 406, where the source matrix 404 specifies French words and their values for each cept and the target matrix 406 specifies English words and their values for each cept. More specifically, the multiplication of the binarized factor matrix F and the transpose of the binarized factor matrix E produces a resulting alignment matrix A, with zero values (identifying words that are not aligned) and non-zero values (identifying words that are aligned), where each non-zero value (illustrated in FIG. 4 using squares) is specified to have a value of one.

C.1 Details of Factorizing the Translation Matrix

As known methods of non-negative matrix factorization do not impose orthogonality between factors, orthogonal non-negative matrix factorization is performed at 302, in FIG. 3, in two stages. In the first stage at 302(A), the translation matrix M is factorized into factor matrices F and E using PLSA, which models a joint probability P(f,e) as a mixture of conditionally independent multinomial distributions, as follows:

$$P(f, e) = \sum_{c=1}^{K} P(c)P(f|c)P(e|c). \quad [2]$$

When F=[P(f|c)], E=[P(e|c)], and S=diag(P(c)), equation [2] is representative of equation [1]. Note also that despite the additional diagonal matrix S, if the factor matrix E is set such that E=P[(e, c)], then P(f|e) would factor as $F \times E^T$, which is representative of the original NMF formulation. Since all factors in equation [2] are (conditional) probabilities, and therefore positive, PLSA also implements NMF.

The parameters of equation [2] are learned from a translation matrix $M=[m_{ij}]$ of $(f_i,e_j)$ counts, by maximizing the likelihood using the iterative re-estimation formula of Expecta-tion-Maximization, as for example disclosed by A. P. Dempster, N. M. Laird, and D. B. Rubin, "Maximum Likelihood From Incomplete Data Via The EM Algorithm", J. Royal Statistical Society, Series B, 39(1):1-38, 1977, and by Eric Gaussier et al., "A Hierarchical Model For Clustering And Categorising Documents", Advances in Information Retrieval, Proceedings of the 24th BCS-IRSG European Colloquium on IR Research (ECIR-02), Glasgow, March 25-27, Lecture Notes in Computer Science 2291, pp. 229-247, Springer, 2002, which are both incorporated in their entirety herein by reference. Convergence is guaranteed, leading to a non-negative factorization of the translation matrix M.

More specifically, the iterative re-estimation formula of Expectation-Maximization ("EM" or "EM solution") iterates over equations [3], [4], [5], and [6] given below after being initialized as follows (where ε is a random value and K, I, and J are the dimensions of matrices F and E):

$$P(c_k) = \frac{1}{K} + \varepsilon, \; P(f_i|c_k) = \frac{1}{I} + \varepsilon, \; P(e_j|c_k) = \frac{1}{J} + \varepsilon,$$

where equation [3] specifies the E-step as follows at time t:

$$P(c_k|f_i, e_j) = \frac{P(c_k)P(f_i|c_k)P(e_j|c_k)}{\underbrace{\sum_{e=1}^{K} P(c_e)P(f_i|c_e)P(e_j|c_e)}_{P(f_i e_j)}}, \quad [3]$$

and where equations [4], [5], and [6] specify the M-steps as follows at time t+1 (i.e., use the estimated values at time t to re-compute the values at time t+1):

$$P(c_k) = \frac{1}{N} \sum_{i,j} m_{ij} P(c_k|f_i, e_j), \quad [4]$$

$$P(f_i|c_k) \propto \sum_{j} m_{ij} P(c_k|f_i, e_j), \quad [5]$$

$$P(e_j|c_k) \propto \sum_{i} m_{ij} P(c_k|f_i, e_j). \quad [6]$$

In the second stage at 302(B), the resulting factor matrices F and E of the first stage at 302(A) are orthogonalized. In a first embodiment of the second stage at 302(B), a probability is calculated such that each word e is aligned together with word f, which is obtained directly from P(e|f), which is the result of the first stage at 302(A). These probabilities are ranked to find the pairs of words with the highest probability. The pairs of words with the highest probabilities are aligned together and assigned a cept. The result of the orthogonalization is to align each source and target word with only one cept, where each cept may align a block (i.e., one or more words) of target words with a block of source words.

In a second embodiment of the second stage at 302(B), each source word $f_i$ and each target word $e_j$ are assigned the most probable cept, which is defined as the cept c for which $P(c|f_i) \propto P(c)P(f_i|c)$ and $P(c|e_j) \propto P(c)P(e_j|c)$ are a maximal, respectively. The elements of the factor matrices F and E are assigned a one or a zero, respectively, as follows:

$$F_{ik} \propto \begin{cases} 1 & \text{if } k = \text{argmax}_c P(c|f_i), \\ 0 & \text{otherwise} \end{cases}$$

$$E_{jk} \propto \begin{cases} 1 & \text{if } k = \text{argmax}_c P(c|e_j) \\ 0 & \text{otherwise} \end{cases}$$

where the proportionality ensures that the column of the factor matrices F and E sum to one, so each matrix remains as a conditional probability matrix. Given the MAP assignment, each line of the factor matrices F and E contains exactly one non-zero element, which is equivalent to having orthogonal factors, or orthogonal, non-negative factorization of the translation matrix M. For example, in the event there exists an ambiguity between the probability of a source word having a high probability to be associated with two different cepts, the MAP assignment forces the source word to be aligned with a single cept.

C.2 Number of Cepts

In general, the number of cepts that relate source and target words is unknown and must be estimated. This estimation process corresponds to choosing the number of components in PLSA, a classical model selection problem. The likelihood computed using PLSA may not be used as it always increases as components are added. A known approach to optimize the complexity of a mixture model is to maximize the likelihood, penalized by a term that increases with model complexity, such as AIC (as disclosed in H. Akaike, "A New Look At The Statistical Model Identification", IEEE Tr. Automatic Control, 19(6):716-723, 1974, which is incorporated herein in its entirety by reference) or BIC (as disclosed in G. Schwartz, "Estimating the dimension of a model", The Annals of Statistics, 6(2):461-464, 1978, which is incorporated in its entirety herein by reference). BIC asymptotically chooses the correct model size (for complete models), while AIC overestimates the number of components yet yields good predictive performance. As the upper limit or largest possible number of cepts is min(I,J), and the lower limit or the smallest number of cepts is one (all $f_i$ aligned to all $e_j$), the optimal number of cepts is estimated by maximizing AIC or BIC between these two limits.

C.3 Accounting for Null Alignments

Alignment to a "null" word may be a feature of the underlying translation model (e.g., the IBM models), or it may be introduced to accommodate words that have a low association measure with all other words. Using PLSA, null alignments are accounted for by introducing a null word on each side ($f_0$ and $e_0$), and two null cepts ("f-null" and "e-null") with a 1:1 alignment to the corresponding null word, to ensure that null alignments will only be 1:N or M:1. This constraint may be implemented using proper initial conditions in EM.

Denoting the null cepts as $c_{f0}$ and $c_{e0}$, one-to-one (1:1) alignment between null cepts and the corresponding null words impose the conditions:

$$P(f_0|c_{f0})=1 \text{ and } \forall i \neq 0, P(f_i|c_{f0})=0; \quad (1)$$

$$P(e_0|c_{e0})=1 \text{ and } \forall j \neq 0, P(e_j|c_{e0})=0. \quad (2)$$

These conditions are preserved as EM iterates over the equations [3], [4], [5], and [6] given above. Thus, in order to account for null alignments, the translation model may be augmented with two null cepts (i.e., source and target), for which the probabilities are initialized according to the conditions above. As these initial conditions are preserved over the EM iterations, proper 1:N and M:1 alignments of null words are preserved as well. The main difference between cepts and null-cepts is that the propriety constraint is relaxed with null-cepts by not forcing null-cepts to be aligned to at least one word on the other side, as situations arise where all words from one side may be aligned with non-null words and therefore do not require null-cept alignments.

Figure 5:
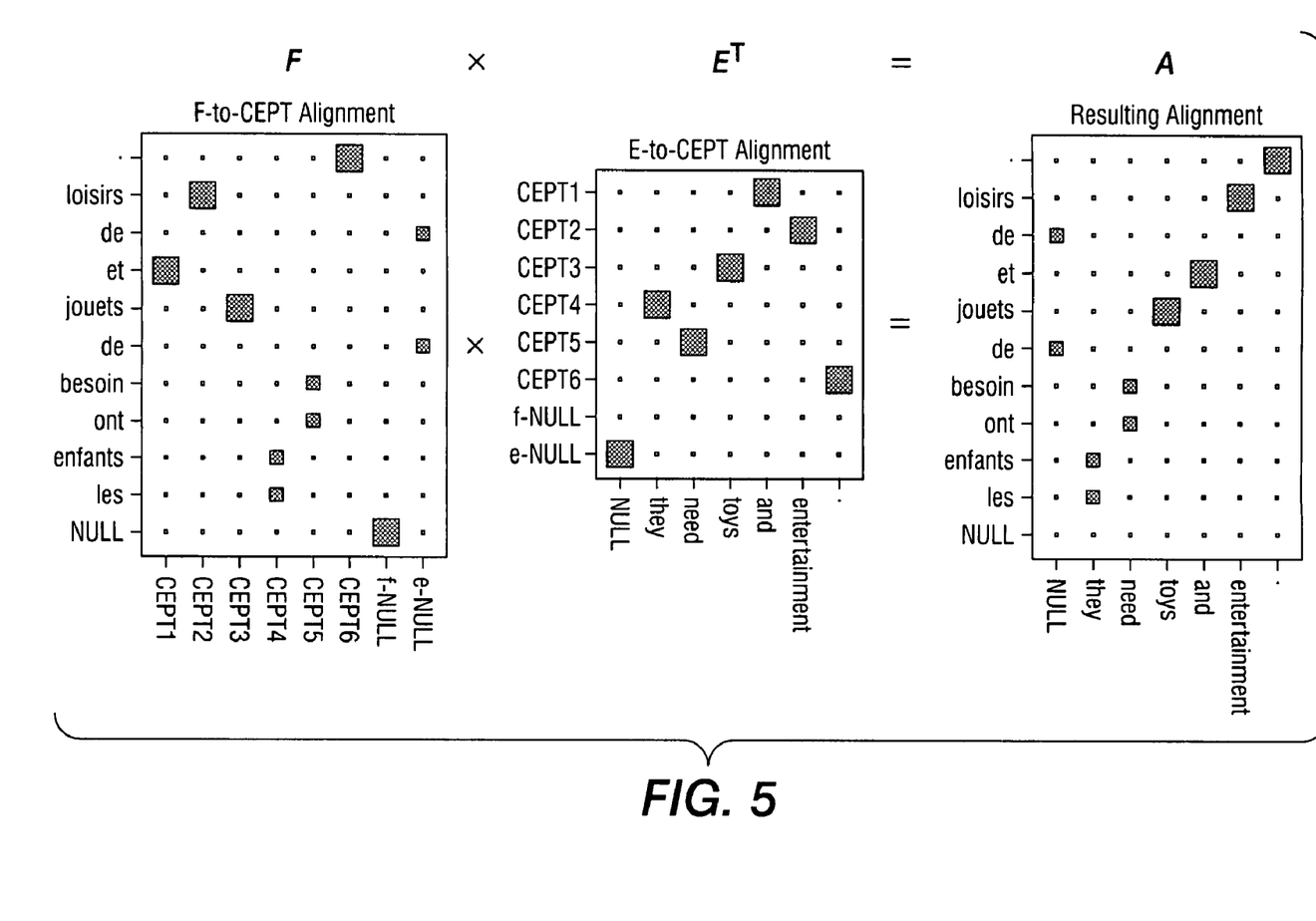
FIG. 5 illustrates an example of word-to-cept and cept-to-word alignment with null cepts.

FIG. 5 illustrates an example of word-to-cept and cept-to-word alignment with f-null cepts (i.e., source null cepts) and e-null cepts (i.e., target null cepts). In the example in FIG. 5, the source sentence "les enfants ont besoin de jouets et de loisirs" and the target sentence is "they need toys and entertainment". Further in FIG. 5, null cepts words "de" in the source sentence are identified and no cepts are identified for the target sentence.

C.4 Modeling Noise

Most elements of the translation matrix M usually have a non-zero association measure. This means that for proper alignments, which produce zero probability to alignments outside identified blocks, actual observations have exactly zero probability (i.e., the log-likelihood of parameters corresponding to proper alignments is undefined). To account for such modeling noise, the model is refined by adding a noise component index by c=0:

$$P(f,e) = \sum_{c>0} P(c)P(f|c)P(e|c) + P(c=0)P(f,e|c=0),$$

where the simplest choice for the noise component is a uniform distribution $P(f,e|c=0) \propto 1$. E-step and M-steps in equations [3]-[6] are thus unchanged for c>0, and the E-step equation for c=0 may be adapted as follows:

$$P(c=0|f,e) \propto P(c=0)P(f,e|c=0).$$

C.5 Model Selection and Stability

Similar to all mixture models, PLSA is subject to local minima. Although random restarts may be used, results from difficult-to-align sentences may continue to be sensitive to initial conditions. Deterministic annealing or tempered EM is a standard technique that may be used to stabilize the EM solution, details of which are disclosed in, K. Rose, E. Gurewitz, and G. Fox, "A Deterministic Annealing Approach To Clustering", Pattern Recognition Letters, 11(11):589-594, 1990, which is incorporated in its entirety herein by reference. As a side effect, deterministic annealing simplifies model selection. At low temperatures, all components are identical, and they differentiate as the temperature increases, until the final temperature, where the EM solution is recovered. By keeping track of the component differentiations, multiple effective numbers of components may be considered in one pass, thereby alleviating the need for costly multiple EM runs with different cept numbers and multiple restarts.

C.6 Other Association Measures

Orthogonal non-negative matrix factorization is a tool for factoring the translation matrix M, which contains measures of association between source words $f_i$ and target words $e_j$. The quality of the resulting alignment depends on the manner in which the translation matrix M is filled. In one embodiment described above, counts from the N-best translations are obtained from the selected translation model (e.g., the IBM models). In an alternate embodiment, the resulting alignments may be weighed according to their probability or rank in the N-best list. In another alternate embodiment, translation and distortion tables obtained from the selected translation model (e.g., the IBM models) may be used to estimate the translation matrix M. In yet another alternate embodiment, the association measures $m_{ij}$ may be obtained in a fully non-parametric way, using corpus statistics rather than translation models, which in turn perform word alignment.

C.7 Exception to Proper Alignments

Words at the sentence level using cepts as described herein are proper with one exception. An improper alignment may occur during the second stage (at 302(B) in FIG. 3) when the factor matrices F and E are orthogonalized using a maximum a posteriori (MAP) assignment of words to cepts. If the MAP assigns f-words but no e-words to a cept (because the e-words have more probable cepts), then "orphan" cepts may be produced, which are aligned to words on only one side of the cept. In one embodiment, orphan cepts are simply removed, and the "orphan" words (i.e., the words associated with orphan cepts) reassigned to one of the remaining cepts, either directly or after retraining PLSA on the remaining cepts (this is guaranteed to converge as there is an obvious solution for K=1).

C.8 Independence Between Sentences

It will be appreciated by those skilled in the art that cepts should not be independent between sentences. However, factorization is optimally performed on a sentence by sentence basis, as what is factorized is the association measures $m_{ij}$ in the translation matrix M. For the sentence-aligned corpus 102 shown in FIG. 1, the association measure between source and target words for two different sentence pairs should be exactly zero because words should not be aligned across sentences. Therefore, the larger translation matrix (calculated on the entire corpus) is block diagonal, with non-zero association measures only in blocks corresponding to aligned sentences. As blocks on the diagonal are mutually orthogonal, the optimal global orthogonal factorization is identical to block-based (i.e., sentence-based) factorization. Any corpus-induced dependency between alignments from different sentences must therefore be built into the association measure $m_{ij}$ using a method other than the factorization method set forth above.

D. Details of Second Method for Proper Word Alignment

The second method for aligning words uses thresholding and transitivity to produce proper alignments of words in a translation matrix M. To recapitulate, word alignment is the task of connecting words between equivalent sentences written in two languages, given a sentence-aligned (bilingual) corpus 102 (i.e., a corpus containing pairs of corresponding sentences written in a first "source" natural language and a second "target" natural language). Word alignment results in a bipartite graph associating which source words correspond to which target words.

Figure 6:
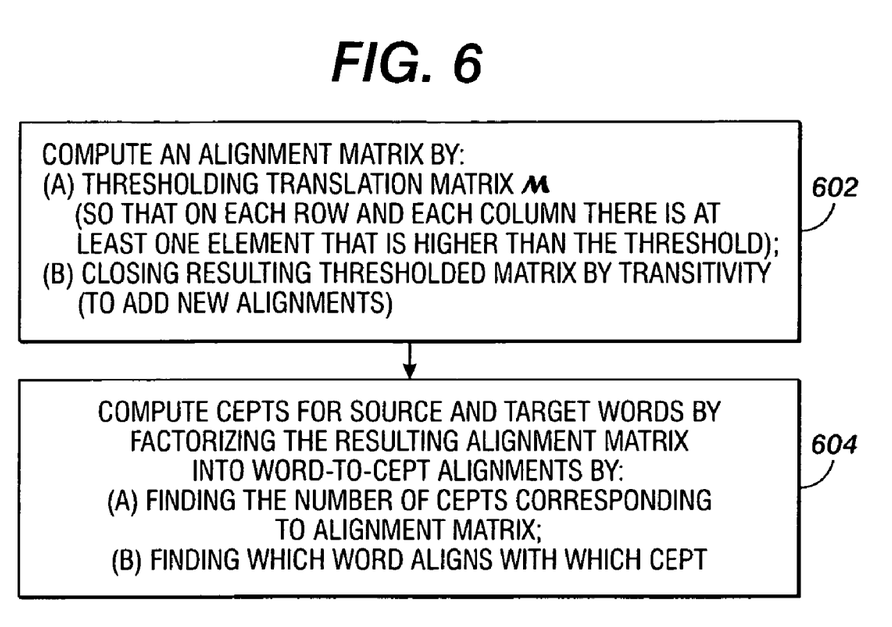
FIG. 6 is a flow diagram of a second method for aligning words in bilingual sentences.

FIG. 6 illustrates a flow diagram setting forth the details of performing the second method. By way of overview, the second method is performed in three stages (i.e., 602(A), 602(B), and 604). As set forth above, the translation matrix M may be given by an I×J translation matrix M=[$m_{ij}$], such that $m_{ij} \geq 0$ measures the strength of the association between source word $f_i$ and target word $e_j$. At the end of the first and second stage (at 602), an I×J alignment matrix A is obtained, such that $a_{ij}$=1 if $f_i$ is aligned with $e_j$ and $a_{ij}$=0 otherwise. In one embodiment, the alignment matrix A is computed by the proper alignment matrix calculator 106 shown in FIG. 1. At the end of the third stage (at 604), word-to-cept alignments are computed, in one embodiment, by the cept calculator 108 shown in FIG. 1.

D.1 Finding the Optimal Threshold

The first stage at 602(A) involves thresholding the translation matrix M, with association measures $m_{ij}$ that indicate the strength of association between each pair of source and target words, while ensuring that both the source and target sides of the translation matrix M are covered. That is, a threshold is selected at 602(A) so that each row/column is associated with at least one column/row (i.e., each row/column has at least one translation) in the translation matrix M.

More specifically, a threshold h will properly cover source/target sides if at least one element on each row/column exceeds the threshold (i.e., for each row i>0, $\max_j(m_{ij}) \geq h$, and for each column j>0, $\max_i(m_{ij}) \geq h$):

$$\forall\, i > 0,\, \max_j(m_{ij}) \geq h \text{ and } \forall\, j > 0,\, \max_i(m_{ij}) \geq h,$$

where the largest threshold h that ensures proper coverage on each side may be defined as the minmax:

$$h_0 = \min\left[\min_{i>0}\left(\max_j(m_{ij})\right),\, \min_{j>0}\left(\max_i(m_{ij})\right)\right].$$

The end result of the first stage at 602(A) is the thresholded matrix $A_0 = (M \geq h_0)$, which contains ones and zeros, such that $a_{ij}$=1 iff $m_{ij} \geq h_0$ and zero otherwise.

In an alternate embodiment, the threshold h may be selected using alternate criteria (e.g., it may be selected to have a value that removes words in the translation matrix M that have a low association measure $m_{ij}$ with other words). In this alternate embodiment to insure that word alignment remains proper after thresholding the translation matrix M, null words may be added to the thresholded translation matrix M in the event a threshold h is selected to have a value that removes words from the translation matrix M.

D.2 Transitive Closure of the Alignment Matrix

The second stage at 602(B) involves closing the resulting thresholded matrix at 602(A) by transitivity to define alignment matrix A having source and target words that are properly aligned. In one embodiment, the word alignment matrix A may be represented as an undirected bi-partite graph matrix G, which is a special case of a directed graph. The graph matrix G is symmetrical because it is undirected. Further the graph matrix G may be split into four sub-matrix blocks (e.g., $G_{11}$, $G_{12}$, $G_{21}$, and $G_{22}$), as for example:

$$G = \begin{bmatrix} G_{11} & G_{12} \\ G_{21} & G_{22} \end{bmatrix},$$

which appear along separations between source and target words (over each row/column index) because it is bipartite. The sub-matrix blocks along the diagonal ($G_{11}$ and $G_{22}$) of the graph matrix (that result after being split into four blocks) are zero, and the two off-diagonal blocks ($G_{21}$ and $G_{12}$) of the graph matrix (that result after being split into four blocks) are the alignment matrix A and its transpose.

Methods for calculating the transitive closure of a directed graph are known, such as the Floyd-Warshall algorithm disclosed in Cormen, Leiserson and Rivest, "Introduction To Algorithms", MIT Press McGraw-Hill Book Company, 1990, the pertinent portions of which are incorporated herein by reference. The Floyd-Warshall algorithm is known to have complexity, which in the case of the I×J alignment matrix A, rather than an N×N graph matrix (where N=I+J), results in an O(IJ(I+J)) complexity.

Another method for calculating the transitive closure of a directed graph is the "power method", which relies only on matrix multiplications. As set forth above, the thresholded matrix $A_0$ "projects" words from one side to the other according to the (potentially improper) alignments that it defines. If $1_i$ is the (row) I-vector containing a 1 in position i and a 0 otherwise, then $1_i \times A_0$ indices the target words aligned to source word $f_i$ according to thresholded matrix $A_0$. Given an alignment matrix A, multiplying by $A^T$ then by A therefore corresponds to aligning target words to source words, then to target words again, according to A. Accordingly, transitive closure corresponds to a state in which the alignment matrix is invariant by the transformation $A \times A^T \times A$. That is, the alignment matrix A is closed by (alignment) transitivity iff A=sign $(A \times A^T \times A)$. The sign operator ensures that elements stay binary; alternatively, Boolean algebra may be used instead.

In accordance with the power method, the thresholded matrix $A_0$ may be closed by:
  (a) assigning the thresholded matrix $A_0$ to be the alignment matrix A (i.e., $A \leftarrow A_0$);
  (b) iteratively performing the transformation sign$(A \times A^T \times A)$ until it converges to $A = \text{sign}(A \times A^T \times A)$ (i.e., while $A \neq \text{sign}(A \times A^T \times A)$: $A \leftarrow \text{sign}(A \times A^T \times A)$), which converges in a finite number of steps, because at each iteration, existing alignments are preserved, as the closure can only "add" new alignments.

For the same reason that the iterative operation at (b) converges, coverage is preserved in the resulting alignment matrix A. Thus, the resulting alignment matrix A is a proper alignment as it ensures coverage and transitive closure. It will be appreciated that the complexity of each iteration at (b) is two matrix multiplications, for a total complexity of O(IJ min(I,J)), plus I×J comparisons for the equivalence test, and the number of iterations is at most the largest number of words per alignment or cept (which in the worst case is at most min(I,J)−1 steps, in the situation when each word on either side is aligned to two consecutive words on the other side).

D.3 Null Alignments

In order to account for null alignments, an additional row and an additional column in the translation matrix M and the alignment matrix A are indexed with zero, which measures the association or alignment with the null words on each side (i.e., source/target). As set forth above for the first embodiment, this requires a different treatment as coverage may not be imposed on null words, and words aligned to null words may be aligned to other words at the same time.

In particular, null alignments provide that a word aligned to a "null" may not be aligned to another word that is not "null". With the threshold method performed at the first stage (at 602(A)), however, this may occur as the association measure $m_{ij}$ may be larger than the threshold for both j=0 and another j>0. In a first embodiment, null words may be accounted for by filtering the threshold matrix in order to remove null alignments for each source and target word, whenever another alignment exists. In a second embodiment, null words may simply be removed from alignments, which results in an alignment matrix A that does not have guaranteed coverage (with the implicit meaning that non-covered words are aligned to null), and postpones additional processing to handle null alignments to the extraction of word-to-cept alignments.

D.4 Deriving Word-To-Cept Alignments

Finally, the third stage at 604 involves factorizing the resulting proper alignments in the alignment matrix A into word-to-cept alignments. That is, once the thresholded matrix $A_0$ has been closed into a proper alignment matrix A at 602, then word-to-cept alignments are determined at 604, which consists of finding the number of cepts corresponding to the alignment matrix A at 604(A), and finding which word on each side (i.e., source/target) align to each cept at 604(B). Described below are two embodiments for deriving word-to-cept alignments in the alignment matrix A.

D.4.a First Method for Deriving Word-to-Cept Alignments

In a first embodiment of the third stage at 604, word-to-cept alignments in the alignment matrix A are derived using Singular Value Decomposition (SVD). An SVD is a factorization of the I×J alignment matrix into three components, as follows:

$$A = U \times D \times V^T = \sum_k u_k d_k v_k,$$

where D is a K×K diagonal matrix (of singular values $d_k$) and U and V are two orthogonal matrices (I×K and J×K, respectively) of singular vectors $u_k$ and $v_k$. The dimension K must be at least equal to the rank of the alignment matrix A to have an exact factorization.

As shown in FIG. 4 discussed previously, different sets of N-to-M alignments correspond to orthogonal "blocks" in the alignment matrix A, which are captured by different singular vectors $u_k$ and $v_k$ (and singular values $d_k$) in the decomposition $$\sum_k u_k d_k v_k.$$

Further, the number of cepts defined in the decomposition is equal to the number of non-zero singular values $d_k$. For each such non-zero singular value $d_k$, the word-to-cept alignments are given by corresponding singular vectors $u_k$ and $v_k$.

Because each "block" in the alignment matrix A is generated by a $u_k d_k v_k$ matrix multiplication, and all values in the singular vectors are smaller than one (because their norm is one), the non-zero singular values $d_k$ must be at least equal to one. In addition, the singular vectors have non-zero values only at places corresponding to the words aligned to the corresponding cept. For example, source words corresponding to the non-zero elements of the second singular vector on the source side are aligned to the same cept as target words corresponding to the non-zero elements of the second singular vector on the target side.

In operation, two implications exist when SVD is performed numerically. First, no singular value will usually be exactly zero, and some "non-zero" singular values may be slightly below one. Second, values of the singular vector may also be different from zero (e.g., slightly greater than zero). In addition, because of symmetry, singular vectors may contain negative elements even though they produce only positive values in the alignment matrix. To account for these implications, singular values may be counted that are larger than or equal to a threshold that is sufficiently close to, but lower than one (e.g., 0.99), and each cept may be aligned with the words corresponding to values in the singular vector that are (in absolute value) above a small threshold (e.g., $1/\sqrt{I}$ or $1/\sqrt{J}$).

D.4.b Second Method for Deriving Word-to-Cept Alignments

Figure 7:
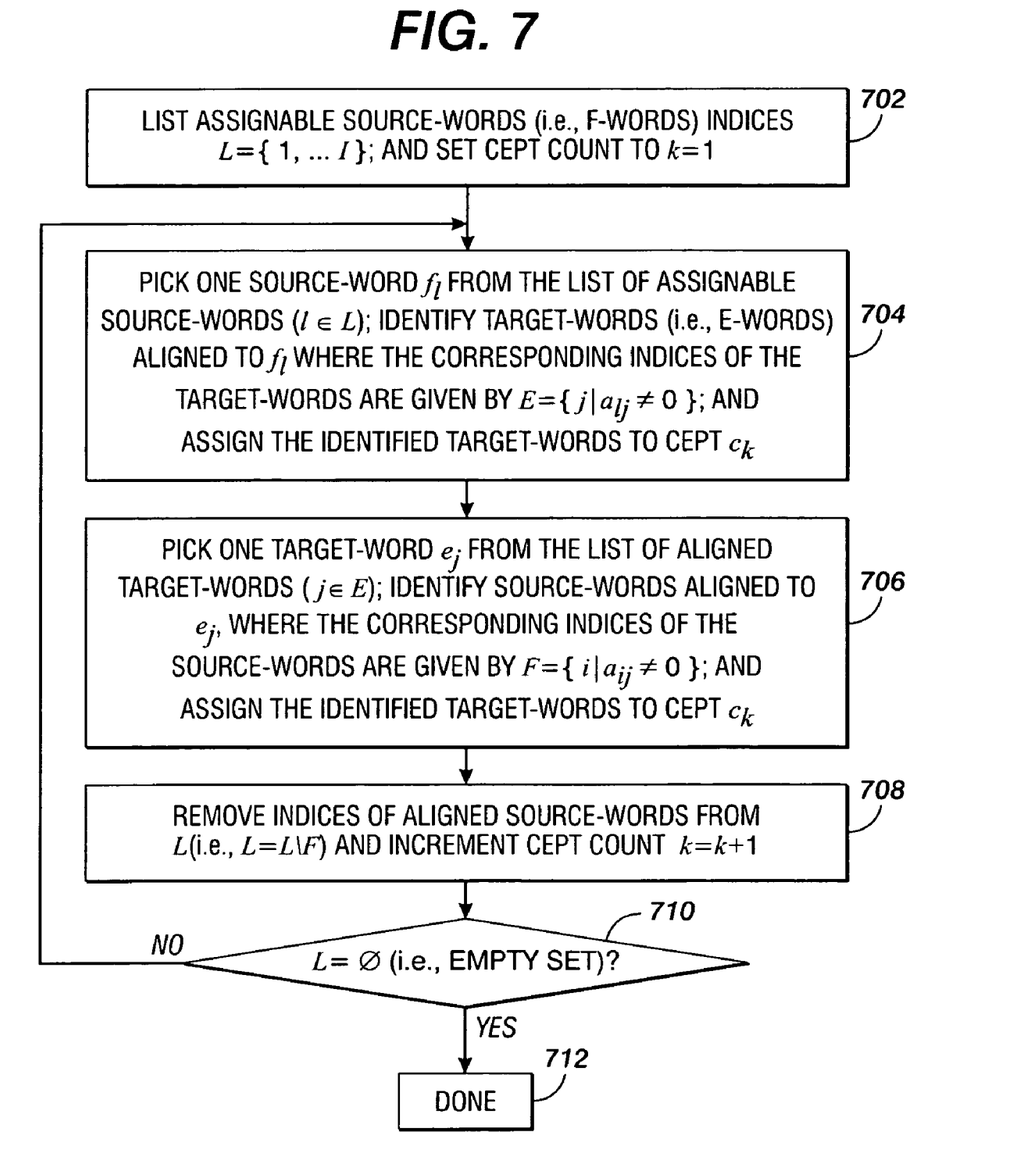
FIG. 7 is a flow diagram detailing a second embodiment of the third stage at 604 of word alignment shown in FIG. 6 for deriving word-to-cept alignments in an alignment matrix A.

FIG. 7 is a flow diagram detailing a second embodiment of the third stage at 604 for deriving word-to-cept alignments in the alignment matrix A. Initially, a list of source word indices is defined (at 702). Subsequently, an f-word (i.e., source word) is picked and all e-words (target words) are found that align to the same cept on the corresponding line of the alignment matrix A (at 704). From any one of these e-words, all f-words are found that align to the same cept (including the original f-word chosen) on the corresponding column of the alignment matrix A (at 706).

The process iterates over all source words (at 708, 710, and 712) identified in the set of source word indices (defined at 702). Identifying aligned target words and source words at each iteration (of 704 and 706, respectively) may be accomplished in J and I iterations, respectively (possibly even less by searching only over non-aligned words), with up to I iterations in L. At each iteration (of 704 and 706), at least one source word $f_i$ will be assigned to the current cept and therefore removed from the "assignable words" list by removing its index from L (at 708), which ensure convergence. The process terminates (at 712) when the set of indices L is an empty set (at 710). In addition, all e-words are aligned to at least one f-word, so all words on either side will be aligned to a cept. By construction, f-words are aligned to a single cept, and because of transitive closure, e-words may not be aligned to different cepts at two different points in the iteration. Further, the method set forth in FIG. 7 does not require null cepts to be handled separately.

For example in performing one iteration using the alignment matrix 107 shown in FIG. 1, when the source word "droit" is selected (at 704), the target words "license" and "fee" are identified as being aligned to it. Subsequently (at 706), one of the aligned target words (e.g., "license") is selected and all source words aligned to it are identified (e.g., "droit", "de", "permis"). Finally (at 708), the indices of aligned source words are removed from the list of assignable source words L, which in this example are indices 2, 3, and 4, corresponding to source words "droit", "de", and "permis", respectively. The iterations continue (at 704) with one of the indices that remains in the set of assignable source word indices L.

E. Applications

Once either the binarized factor matrix F and the binarized factor matrix E specifying cepts for the source and target words (e.g., cept alignment 109) or the alignment matrix A (e.g., alignment matrix 107) are determined, the more convenient form of representing cepts is used by the linguistic application processing system to perform one or more natural language applications, including: multilingual information retrieval, bilingual terminology extraction from alignments, machine translation (including phrase-based translation models), projection of linguistic features, projection of linguistic annotation from one language to another, cross-lingual categorization, and multilingual lexical extraction. For example, in performing machine translation, the phrase "license fee" as set forth by either cept alignment 109 or alignment matrix 107 indicates it may be translated as "droit de permis".

F. Miscellaneous

For additional details, of examples, experiments and background on word alignment using matrix factorization, the following article is incorporated in its entirety herein by reference: Cyril Goutte et al., "Aligning Words Using Matrix Factorisation", in: 42nd Annual Meeting of the Association for Computational Linguistics, Jul. 25-26, 2004, Barcelona, Spain.

Those skilled in the art will recognize that a general purpose computer may be used for implementing the system 100 shown in FIG. 1 and described herein. Such a general purpose computer would include hardware and software. The hardware would comprise, for example, a processor (i.e., CPU), memory (ROM, RAM, etc.), persistent storage (e.g., CD-ROM, hard drive, floppy drive, tape drive, etc.), user I/O, and network I/O. The user I/O can include a camera, a microphone, speakers, a keyboard, a pointing device (e.g., pointing stick, mouse, etc.), and the display. The network I/O may for example be coupled to a network such as the Internet. The software of the general purpose computer would include an operating system and application software providing the functions of the system 100.

Further, those skilled in the art will recognize that the forgoing embodiments may be implemented as a machine (or system), process (or method), or article of manufacture by using standard programming and/or engineering techniques to produce programming software, firmware, hardware, or any combination thereof. It will be appreciated by those skilled in the art that the flow diagrams described in the specification are meant to provide an understanding of different possible embodiments. As such, alternative ordering of the steps, performing one or more steps in parallel, and/or performing additional or fewer steps may be done in alternative embodiments.

Any resulting program(s), having computer-readable program code, may be embodied within one or more computer-usable media such as memory devices or transmitting devices, thereby making a computer program product or article of manufacture according to the embodiment described herein. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts may involve the use of a memory or transmitting device which only embodies program code transitorily as a preliminary or final step in making, using, or selling the embodiments as set forth in the claims.

Memory devices include, but are not limited to, fixed (hard) disk drives, floppy disks (or diskettes), optical disks, magnetic tape, semiconductor memories such as RAM, ROM, Proms, etc. Transmitting devices include, but are not limited to, the Internet, intranets, electronic bulletin board and message/note exchanges, telephone/modem based network communication, hard-wired/cabled communication network, cellular communication, radio wave communication, satellite communication, and other stationary or mobile network systems/communication links.

A machine embodying the embodiments may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the disclosure as set forth in the claims.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method for aligning words of natural language sentences which ensures a proper N:M alignment between source and target words by satisfying coverage and transitive closure, comprising:

receiving a corpus of aligned source sentences $f=f_1 \ldots f_i \ldots f_I$ composed of source words $f_1, \ldots f_I$, and target sentences $e=e_1 \ldots e_j \ldots e_J$ composed of target words $e_1, \ldots e_J$; the source sentences being in a first natural language and the target sentences being in a second natural language;

with a processor producing a translation matrix M with association measures $m_{ij}$; each association measure $m_{ij}$ in the translation matrix providing a valuation of association strength between each source word $f_i$ and each target word $e_j$;

producing one or more of an alignment matrix A and cepts that link aligned source and target words, including performing orthogonal non-negative matrix factorization of the translation matrix M, ensuring that the one or more of the alignment matrix and cepts defines a proper N:M alignment between source and target words by satisfying coverage and transitive closure;

wherein coverage is satisfied when each source word is aligned with at least one target word and each target word is aligned to at least one source word; and wherein transitive closure is satisfied if when source word $f_i$ is aligned to target words $e_j$ and $e_l$, and source word $f_k$ is aligned to target word $e_l$, then source word $f_k$ is also aligned to target word $e_j$.

2. The method according to claim 1, wherein said performing of the orthogonal non-negative matrix factorization of the translation matrix M comprises:

factorizing the translation matrix into factor matrices; and
orthogonalizing the factor matrices.

3. The method according to claim 2, wherein said producing the alignment matrix further comprises computing the alignment matrix by multiplying the orthogonalized factor matrices.

4. The method according to claim 3, wherein said producing the translation matrix further comprises:

training a first statistical machine translation model to translate from the source language to the target language;

training a second statistical machine translation model to translate from the target language to the source language using training data;

generating a set of translations by computing hypothetical translation paths between translation pairs in the sentence aligned corpus using the first and second translation models; and summing the occurrence of each word-pair that appears in each translation path generated using the first and second translation models to define the association measures $m_{ij}$ in the translation matrix for the sentence aligned corpus.

5. The method according to claim 4, further comprising outputting the one or more of the alignment matrix and the cepts to a natural language application.

6. The method according to claim 5, wherein the natural language application comprises one or more of a combination of: multilingual information retrieval, bilingual terminology extraction, machine translation, projection of linguistic features, annotation, cross-lingual categorization, and multilingual lexical extraction.

7. The method according to claim 1, wherein said producing the alignment matrix further comprises:

thresholding the translation matrix; and
closing the thresholded matrix by transitivity.

8. The method according to claim 7, wherein said producing the alignment matrix further comprises computing word-to-cept alignments from the proper alignment matrix by factorizing the alignment matrix into word-to-cept alignments.

9. The method according to claim 8, wherein said factorizing the alignment matrix further comprises:

determining how many cepts correspond to the alignment matrix using an estimating process corresponding to choosing the number of components in Probabilistic Latent semantic Analysis (PLSA); and finding which words align with which cept.

10. The method according to claim 9, wherein said producing the translation matrix further comprises:

training a first statistical machine translation model to translate from the source language to the target language;

training a statistical second machine translation model to translate from the target language to the source language;

generating a set of hypothetical translation paths between translation pairs in the sentence aligned corpus using the first and second translation models;

summing the occurrence of each word-pair that appears in each translation path generated using the first and second translation models to define the association measures $m_{ij}$ in the translation matrix.

11. The method according to claim 10, further comprising outputting the one or more of the alignment matrix and the cepts to a natural language application.

12. The method according to claim 11, wherein the natural language application comprises one or more of a combination of: multilingual information retrieval, bilingual terminology extraction, machine translation, projection of linguistic features, annotation, cross-lingual categorization, and multilingual lexical extraction.

13. The method according to claim 1, wherein the performing of the orthogonal non-negative matrix factorization of translation matrix M includes using probabilistic latent semantic analysis to factorize translation matrix M onto factor matrices F and E and orthogonalizing the factor matrices F and E.

14. The method according to claim 1, wherein the producing of the alignment matrix A includes factorizing translation matrix M onto binarized factor matrices F and E computing the product of a binarized factor matrix F and the transpose of a binarized factor matrix E.

15. The method according to claim 1, wherein each cept aligns a subset of the source words to a subset of the target words, where each of the source and target words in the subsets satisfies the constraint of propriety and wherein each of the source and target words in the subsets is connected to a single cept.

16. An apparatus for aligning words of natural language sentences which ensures a proper N:M alignment between source and target words by ensuring that coverage and transitive closure are satisfied in each alignment produced, comprising:

a memory for storing natural language processing instructions of the apparatus; and a processor coupled to the memory for executing the natural language processing instructions of the apparatus; the processor in executing the natural language processing instructions:

receiving a corpus of aligned source sentences f=f$_1$ ... f$_i$ ... f$_I$ composed of source words f$_1$, ... f$_I$, and target sentences e=e$_1$ ... e$_j$ ... e$_J$ composed of target words e$_1$, ... e$_J$; the source sentences being in a first natural language and the target sentences being in a second natural language;

producing a translation matrix M with association measures m$_{ij}$; each association measure m$_{ij}$ in the translation matrix providing a valuation of association strength between each source word f$_i$ and each target word e$_j$;

producing one or more of an alignment matrix A and cepts that link aligned source and target words, including performing orthogonal non-negative matrix factorization of the translation matrix M, which ensures that the one or more of the alignment matrix and cepts defines a proper N:M alignment between source and target words by ensuring that coverage and transitive closure are satisfied each time an alignment matrix is generated and each time cepts are generated;

wherein coverage is satisfied when each source word is aligned with at least one target word and each target word is aligned to at least one source word; and wherein transitive closure is satisfied if when source word f$_i$ is aligned to target words e$_j$ and e$_l$, and source word f$_k$ is aligned to target word e$_l$, then source word f$_k$ is also aligned to target word e$_j$.

17. The apparatus to claim 16, wherein the processor in executing the natural language processing instructions further comprises outputting the one or more of the alignment matrix and the cepts to a natural language application.

18. The apparatus according to claim 17, wherein the natural language application comprises one or more of a combination of: multilingual information retrieval, bilingual terminology extraction, machine translation, projection of linguistic features, annotation, cross-lingual categorization, and multilingual lexical extraction.

19. The apparatus according to claim 16, wherein the processor in executing the natural language processing instructions when producing the one or more of the alignment matrix and the cepts further comprises:
factorizing the translation matrix into factor matrices; and
orthogonalizing the factor matrices.

20. The apparatus according to claim 19, wherein the processor in executing the natural language processing instructions when producing the alignment matrix further comprises computing the alignment matrix by multiplying the orthogonalized factor matrices.

21. The apparatus according to claim 16, wherein the processor in executing the natural language processing instructions when producing the alignment matrix further comprises:
thresholding the translation matrix; and
closing the thresholded matrix by transitivity.

22. The apparatus according to claim 21, wherein the processor in executing the natural language processing instructions when producing the alignment matrix further comprises computing word-to-cept alignments from the proper alignment matrix by factorizing the alignment matrix into word-to-cept alignments.

23. The apparatus according to claim 22, wherein the processor in executing the natural language processing instructions when factorizing the alignment matrix further comprises:
determining how many cepts correspond to the alignment matrix; and
finding which words aligns with which cept.

24. An article of manufacture embedded on a memory device for use in a machine, comprising:
instructions stored in the memory device for performing a method for aligning words of natural language sentences which ensures a proper N:M alignment between source and target words by ensuring that coverage and transitive closure are satisfied in an alignment produced, the method comprising:
receiving a corpus of aligned source sentences f=f$_1$ ... f$_i$ ... f$_I$ composed of source words f$_1$, ... f$_I$, and target sentences e=e$_1$ ... e$_j$ ... e$_J$ composed of target words e$_1$, ... e$_J$; the source sentences being in a first natural language and the target sentences being in a second natural language;
producing a translation matrix M with association measures m$_{ij}$; each association measure m$_{ij}$ in the translation matrix providing a valuation of association strength between each source word f$_i$ and each target word e$_j$, the producing comprising:
training a first statistical machine translation model to translate from the source language to the target language;
training a second statistical machine translation model to translate from the target language to the source language;
generating a set of translations by computing hypothetical translation oaths between translation pairs in the sentence aligned corpus using the first and second translation models; and
summing the occurrence of each word-pair that appears in each translation path generated using the first and second translation models to define the association measures m$_{ij}$ in the translation matrix;
producing one or more of an alignment matrix A and cepts that link aligned source and target by performing orthogonal non-negative matrix factorization by factoring translation matrix M onto factor matrices F and E and orthogonalizing factor matrices F and E;
the one or more of the alignment matrix and cepts defining a proper N:M alignment between source and target words by ensuring coverage and transitive closure are satisfied, wherein each source word has at least one target word;
wherein coverage is satisfied when each source word is aligned with at least one target word and each target word is aligned to at least one source word; and
wherein transitive closure is satisfied if when source word f$_i$ is aligned to target words e$_j$ and e$_l$, and source word f$_k$ is aligned to target word e$_l$, then source word f$_k$ is also aligned to target word e$_j$.

* * * * *